(12) United States Patent
Blackmon et al.

(10) Patent No.: US 6,440,019 B1
(45) Date of Patent: Aug. 27, 2002

(54) SOLAR POWER SYSTEM DRIVE UNIT

(75) Inventors: James Bertram Blackmon, Brownsboro; Frederick S. Gant, Huntsville, both of AL (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 09/640,428

(22) Filed: Aug. 17, 2000

(51) Int. Cl.$^7$ .............................. F16H 7/08; F16H 7/12; F16M 11/12; F24J 2/38
(52) U.S. Cl. .................. 474/101; 474/111; 474/133; 248/183.2; 126/573
(58) Field of Search ................... 474/101, 111, 474/114–117, 133, 140, 135, 88, 112, 141, 146, 144; 126/593, 600, 601, 605, 698, 577, 572, 573, 604–607; 248/183.2, 179, 183, 694; 343/709, 765

(56) References Cited

U.S. PATENT DOCUMENTS

| | | | |
|---|---|---|---|
| 1,988,421 A | * 1/1935 | McCann et al. | 474/111 |
| 2,499,287 A | * 2/1950 | Wilson | 474/135 X |
| 4,141,626 A | 2/1979 | Treytl et al. | 126/270 |
| 4,192,583 A | 3/1980 | Horton | |
| 4,205,661 A | 6/1980 | Chapman | |
| 4,282,581 A | 8/1981 | Bondurant et al. | |
| 4,295,621 A | * 10/1981 | Siryj | 248/183.2 |
| 4,442,435 A | * 4/1984 | Kiryu et al. | 343/709 |
| 4,585,318 A | * 4/1986 | Seifert | 126/573 X |
| 4,832,002 A | * 5/1989 | Medina | 126/577 |
| 5,049,114 A | * 9/1991 | Hayden | 474/111 |
| 5,411,444 A | 5/1995 | Nakamura et al. | 174/148 |
| 6,165,089 A | * 12/2000 | McGreal et al. | 474/101 |

FOREIGN PATENT DOCUMENTS

| | | | | |
|---|---|---|---|---|
| FR | 962341 | * | 6/1950 | 474/135 |
| GB | 552150 | * | 3/1943 | 474/135 |
| JP | 31278 | * | 3/1977 | 474/111 |

* cited by examiner

*Primary Examiner*—David A. Bucci
*Assistant Examiner*—Marcus Charles
(74) *Attorney, Agent, or Firm*—Harness Dickey & Pierce P.L.C.

(57) ABSTRACT

An azimuth drive unit for a solar power system has a multistage sprocket configuration. The drive unit includes an input shaft for receiving an input torque, where the multistage sprocket configuration is coupled to the input shaft. The sprocket configuration converts the input torque into an output torque, and an output shaft is coupled to the sprocket configuration for applying the output torque to a solar reflector. In a highly preferred embodiment, the sprocket configuration includes a tensioning system contacting one or more of the chains and a housing of the drive unit. The tensioning system applies a tension force to the contacted chains such that backlash in the sprocket configuration is reduced. The present invention also provides for a plurality of bearing members coupled to the output shaft for adding stiffness to the output shaft. The use of a multistage sprocket configuration eliminates destructive backlash forces, dampens shock, prevents reflector oscillations, and provides redundancy while reducing the overall cost of the drive unit.

7 Claims, 9 Drawing Sheets

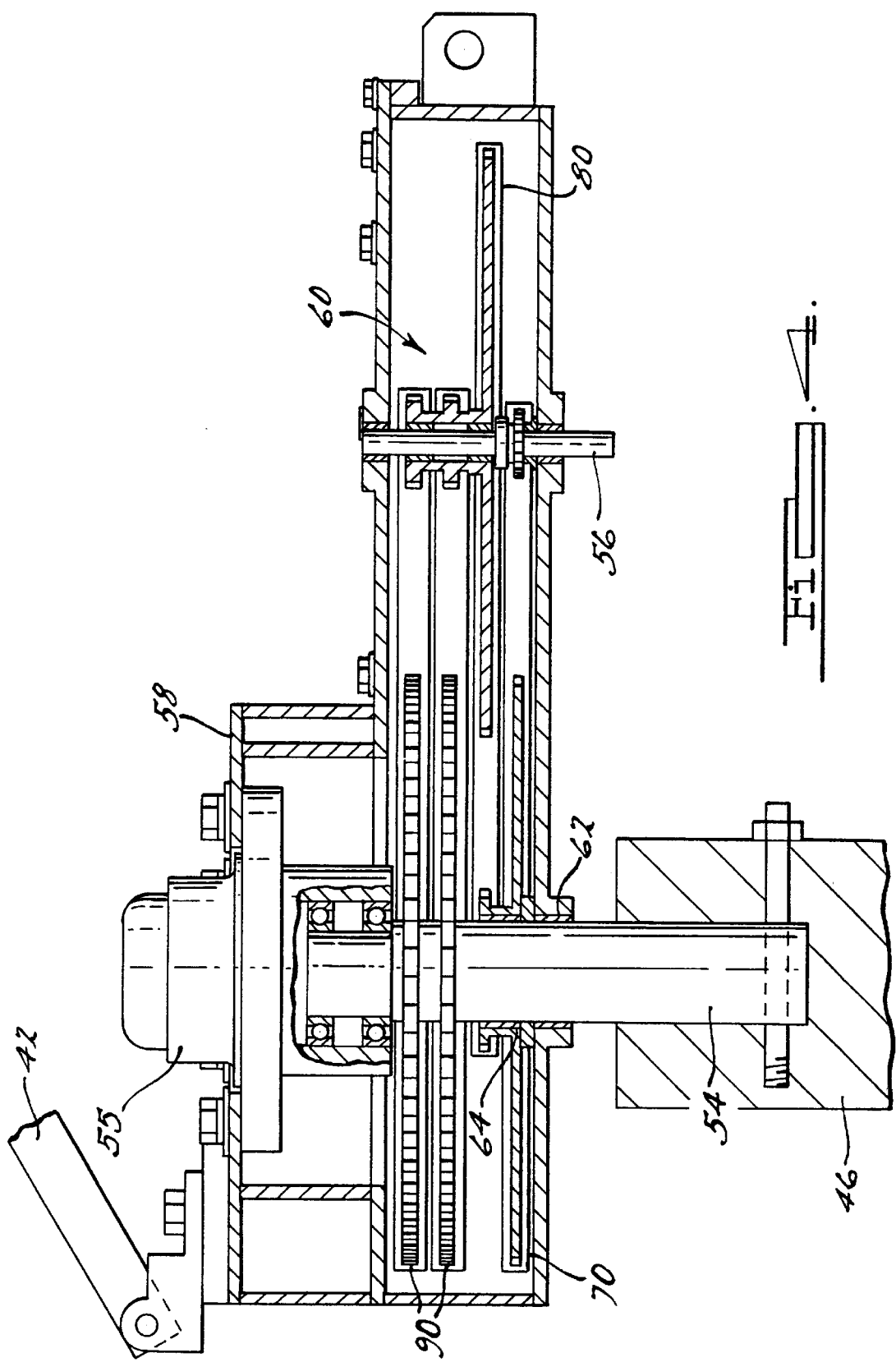

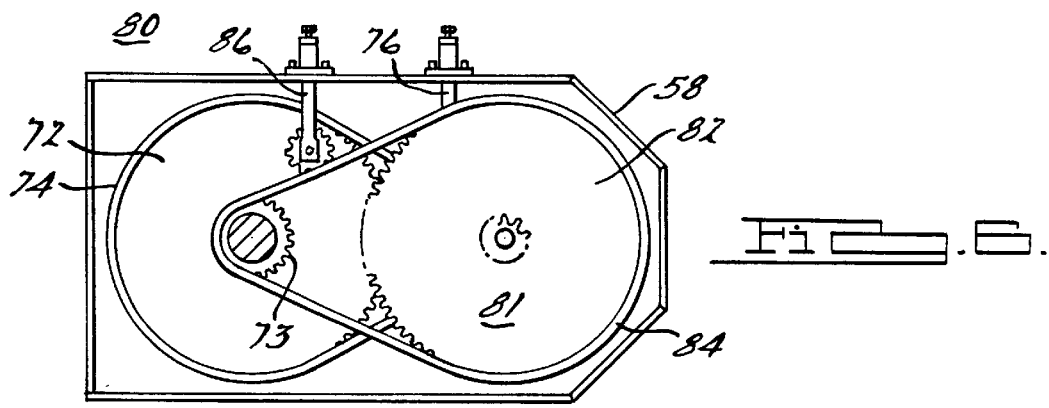
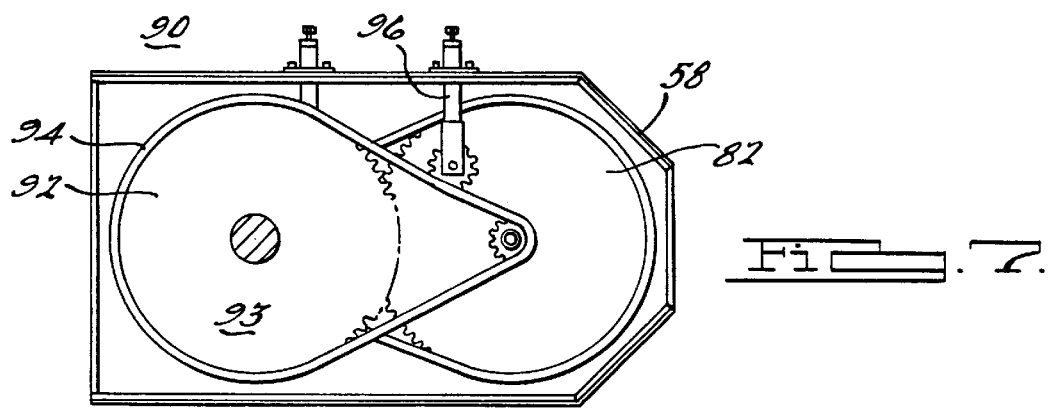
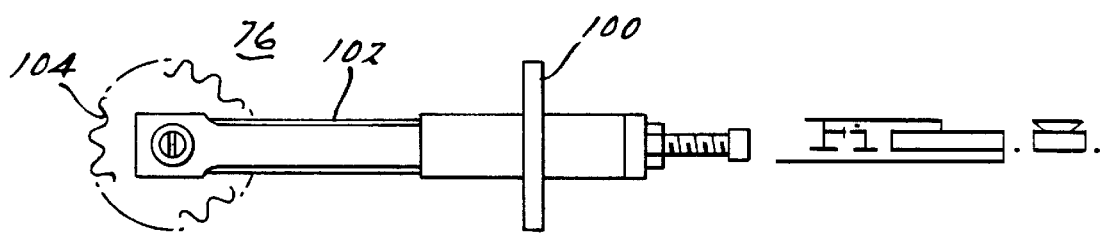
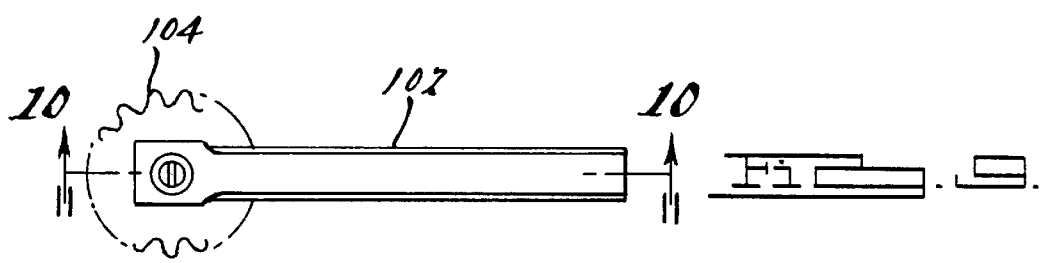

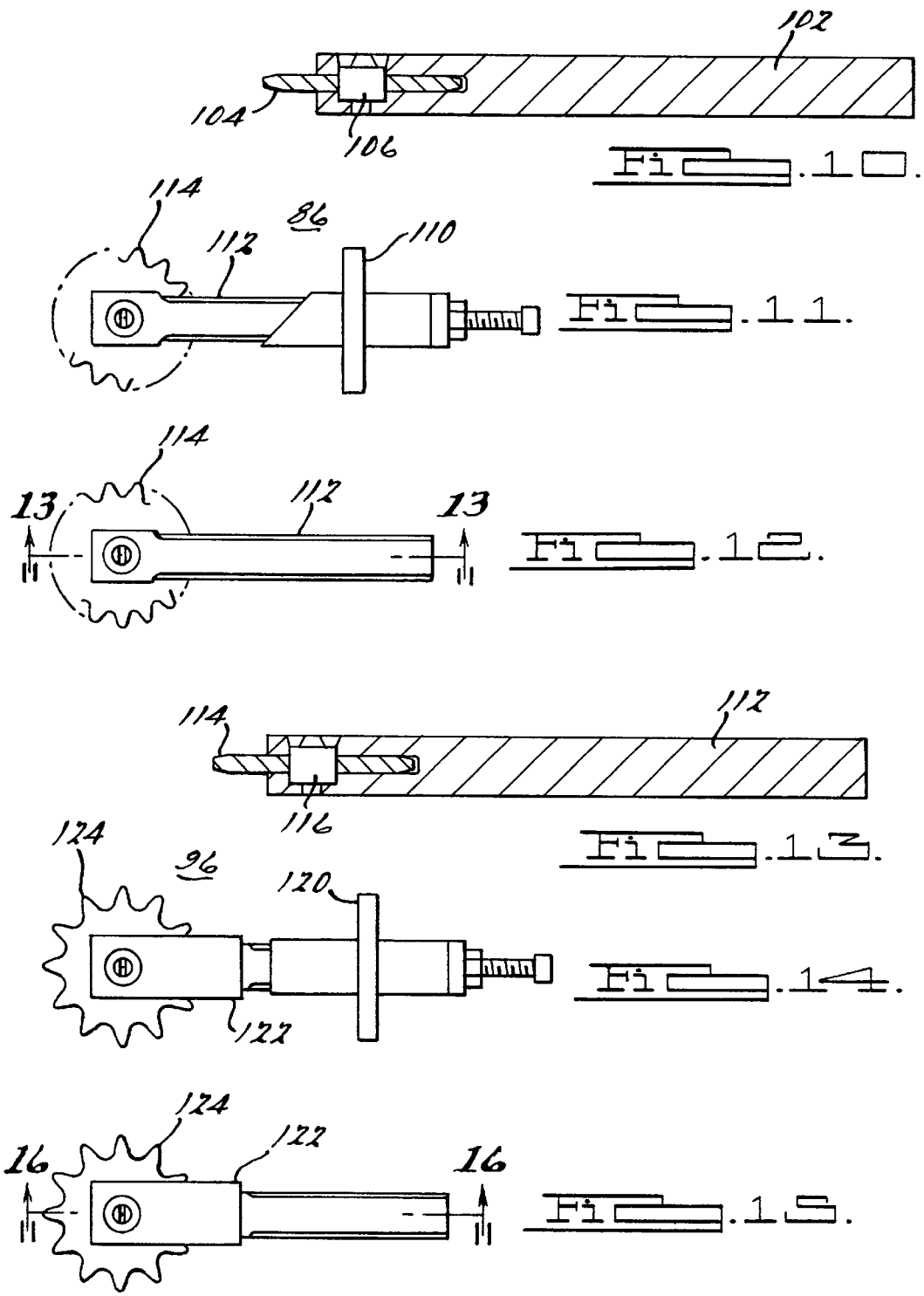

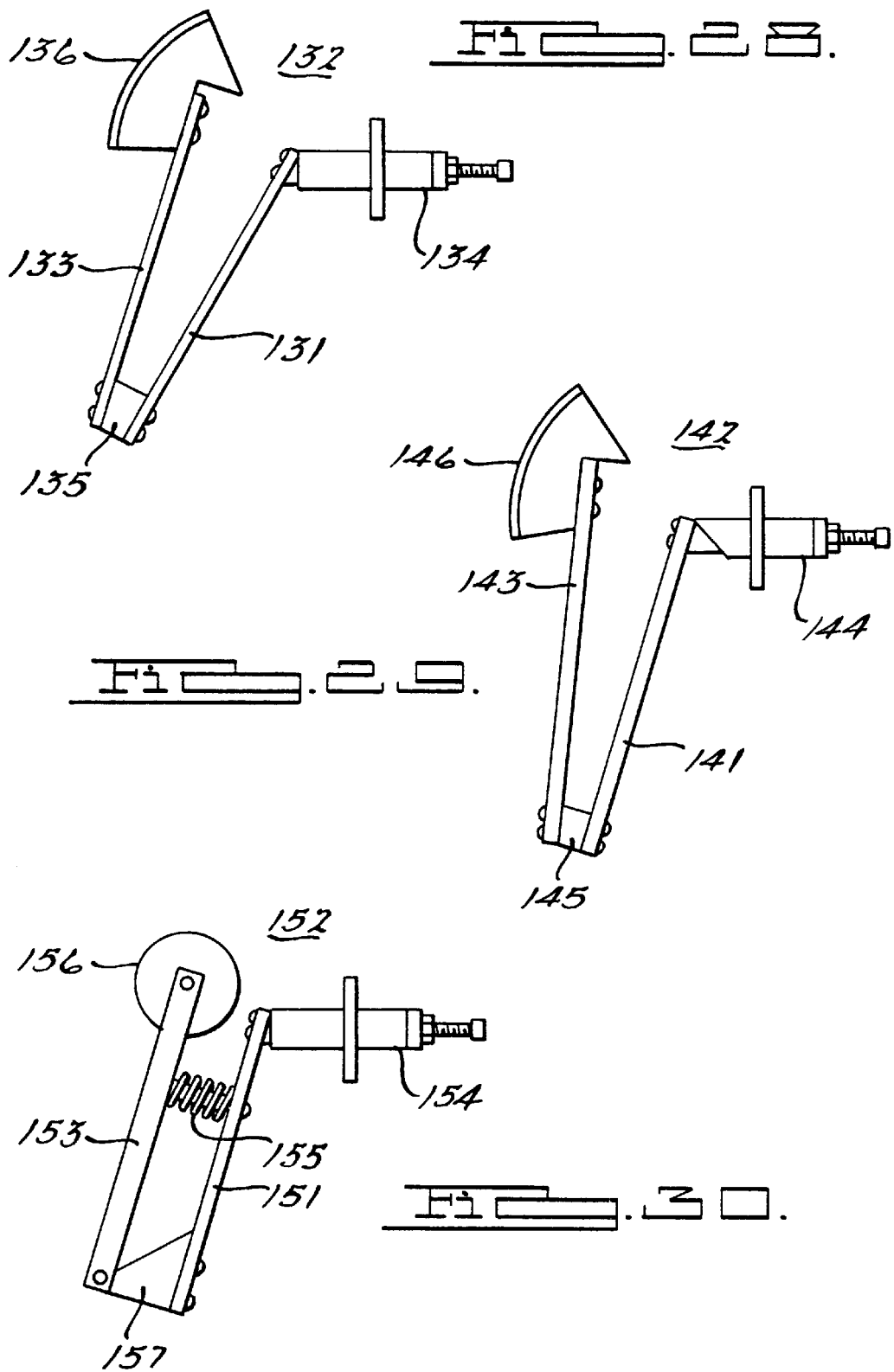

SOLAR POWER SYSTEM DRIVE UNIT

TECHNICAL FIELD

The present invention relates generally to solar power systems. More particularly, the invention relates to an azimuth drive unit for a solar power system having a multistage chain and sprocket configuration.

BACKGROUND ART

High concentration solar power systems typically use reflectors, drive systems, and receivers to provide thermal energy for various industrial and commercial processes. Each reflector transfers solar radiation to a receiver and is typically a parabolic trough, a dish concentrator, or a field of heliostats. The reflected radiation heats a working fluid and drives a power conversion system to produce electricity. Similarly, tracking photovoltaic systems ensure that the solar irradiance incident on the solar arrays meets appropriate optical requirements. In each case, the drive system allows the reflectors or collector to track the sun in azimuth and elevation and is critical to the overall solar power system performance.

As already mentioned, the drive system essentially has the same requirements for all of the above types of reflectors. Accurately tracking the sun requires that the drive system meets exacting requirements under a wide variety of environmental conditions. The drive system must therefore have minimal backlash, high stiffness, and sufficient efficiency to allow for small tracking movements, even in the presence of wind loads associated with wind speeds on the order of 30 to 50 mph (18–31 kmph). Furthermore, the drive system can be subjected to temperatures ranging from lows on the order of 20 to 40° F. (−6° to 4° C.) below zero to highs on the order of 130° F. (54° C.) and above. Other harsh environmental conditions include rain, snow, ice, earthquakes, dust intrusion, corrosion, etc.

As already noted, in virtually all heliostat and dish concentrator designs, the configuration of the drive system is based on the standard elevation and azimuth approach. Similarly, parabolic trough reflectors require the drive system to rotate about its longitudinal axis. Photovoltaic trackers ensure that the solar irradiance incident on the solar arrays meets the appropriate optical requirements and are fundamentally similar to the above discussed systems. For heliostats and dishes, the azimuth drive unit is typically supported by a vertical pedestal, about which the reflector (mounted on the drive unit) rotates. The elevation drive unit can either be another rotational drive unit, or it can be a linear actuator. The azimuth drive unit is commonly the more costly unit. It is therefore desirable to provide a low cost azimuth drive unit that has low backlash, exhibit high stiffness, and allow for sufficiently small tracking movements under harsh environmental conditions.

The primary design requirement for azimuth drive units is that the reduction ratio be sufficient to ensure that tracking error is on the order of 0.1 to 1.0 milliradians for the reflected beam. The specific requirement for tracking accuracy and angular rate depends on the application, but in general, the drive unit itself should be able to maintain pointing accuracies of this magnitude. These pointing accuracies must be with slow rates (approximately 150 per hour), and wind speeds on the order of 30 mph (18 kmph). Higher rotation rates are necessary for emergency slew, start up and shut down, and certain maintenance conditions. In practice, the azimuth drive unit must have an overall reduction ratio on the order of 40,000 to 1. It should be noted that with the high reduction ratio and slow speed, the actual azimuth drive unit horsepower rating is low (typically on the order of 1/50 to 1 horsepower motors), with most applications tending towards fractional horsepower.

Another design requirement is that the azimuth drive unit be able to acquire the sun over a wide azimuthal angular range, since the sun's position varies significantly over the course of a year. For heliostats and dishes, used for either solar thermal or photovoltaic systems, the elevation angular range is approximately 90 degrees. This is unless inverted stow is used, in which case the range is approximately 180 degrees. There are situations in which the sun's passage through the sky requires the reflector to move around a so-called "singularity position." This is caused by the sun's angle and the reflector's location and aimpoint being such that the reflector would tend to move in an angle that lies below horizontal. In this special case, the reflector is rotated in azimuth 180 degrees or more to easily move to the required position. For the parabolic trough, the rotational range is on the order of 180 degrees, east to west, or less, if the troughs are aligned with the longitudinal axis along an east-west line.

Another design requirement is that the drive units be able to withstand the static and dynamic loads imposed primarily by wind and gravity. Wind-induced dynamic loads (wind gusts) impose particularly severe effects that lead to premature failures. Most of the drive unit failures observed over the years involve sudden shock loads imposed on essentially non-compliant drive unit components, such as gear teeth, etc. In these cases, the need for stiffness (little or no backlash and little compliance) means that there is little or no damping of the imposed loads. Thus, high shock loads may be imposed throughout the drive train.

A number of drive units have been developed that meet the above requirements, but in general, these units are custom designed. Thus, much of the hardware and components are made especially for the specific application. As a result, conventional units are relatively expensive, especially in the low production quantities needed for early market entry. This increased cost is one of the reasons that the high concentration solar thermal energy industry has had difficulty achieving competitively priced electricity. Since the heliostat or dish is typically on the order of one-half the cost of the entire system, and the drive unit cost is typically on the order of one-third to one-half that of the heliostat or collector, the impact of the drive unit cost on the system can be prohibitive. This is especially true for early production rates.

There has been a tendency over the last 25 years among virtually all developers of heliostats to build larger units, resulting in aperture areas of 100 to 150 square meters or higher. This tendency to develop relatively large size heliostats has further increased the difficulty of achieving low cost for early market penetration with relatively low initial production rates. This is especially true for the drive units, since the tooling and factory setup costs are high for these custom designs, and the costs must be amortized over a relatively small number of units. The tooling costs themselves are also higher for larger drive units, In addition, for the same total power capacity needed in the market, fewer units will be produced, which means that the cost improvements occurring as a part of the manufacturing learning curve will be less.

By having smaller heliostat surface areas, and hence lower loads, a larger number of commercial components would be available for potential use, as opposed to developing custom drive units. It can also be shown that the wind induced loads on small heliostats are lower than for large heliostats. This is because there is a boundary layer effect that causes the wind speed to be less within a few meters of the surface, and higher at about 5 meters and up. Thus, small heliostats would have a higher design safety factor, using the same wind speed (typically measured at least 5 meters above ground).

An additional problem with large heliostats is that the optical performance suffers as the aperture area increases. Therefore, a larger total heliostat area is needed for the same size plant output power, which has a substantial effect on the cost of the system. It should be noted that the heliostats are normally built with a range of curvatures, depending on their location in the field, such that they tend to concentrate the sunlight on the receiver. It can be shown by optical analysis codes and theory that for a given size of heliostat field and receiver, increasing the size of the individual heliostats will increase the off-axis aberration, resulting in increased optical losses. For example, it has been shown in ray trace simulations that the optical losses are on the order of 20 percent as the heliostat size is increased from approximately 10 $m^2$ to 50 $m^2$ to 100 $m^2$. Conversely, making the heliostats too small increases the cost associated with field wiring, controllers, and installation. Therefore, there is an optimum reflector size for any given application.

The size of a dish concentrator is determined by the power rating and efficiency of the power conversion unit. For the McDonnell Douglas designed 25 kilowatt electric Dish Stirling concentrator, the aperture area is 90 $m^2$. A similar design in principle was developed under DOE sponsorship—this unit has a 120 $m^2$ aperture area and approximately a 20 to 25 kilowatts electric output. There are other Stirling units available, however, with approximately 3 to 10 kilowatts electric output, and in principle, other sizes could be achieved. Similarly, concentrating photovoltaic or tracking, non-concentrating photovoltaic systems can be developed for practically any required size. Trough collectors are usually joined together for lengths of tens to hundreds of feet length. In general, the drive unit power rating and reduction ratio is similar to that for heliostats and dish concentrators.

Therefore, another desirable capability related to cost of the drive unit, is its ability to be used with visually no modifications for a multitude of applications. This would increase the production rate, and thereby reduce the cost. In addition, the drive unit should be such that it can be relatively easily modified for use with a range of sizes and still be cost effective.

It is, therefore, desirable to provide a low cost, high performance drive unit primarily for application to a high concentration solar central receiver, but which has application across a wide range of systems. It is also desirable for the azimuth drive unit to be useful for trough concentrator systems requiring large angular range.

SUMMARY OF THE INVENTION

The above and other objectives are provided by an azimuth drive unit for a solar system in accordance with the present invention. The azimuth drive unit of the present invention includes an input shaft for receiving an input torque, and a multi-stage chain and sprocket configuration coupled to the input shaft. The sprocket configuration converts the input torque into an output torque, and an output shaft is coupled to the sprocket configuration for applying the output torque to a solar reflector. Use of a multi-stage sprocket configuration eliminates destructive backlash forces, dampens shock, prevents reflector oscillations and provides redundancy while reducing costs. The multi-stage sprocket configuration also allows the drive unit to be used in a wide range of systems.

Further in accordance with the present invention, a multi-stage sprocket configuration for a solar power system azimuth drive unit having an input torque is provided. The sprocket configuration includes a plurality of sprockets, and a plurality of chains linking the sprockets such that the input torque is converted into output torque. The sprocket configuration further includes a tensioning system contacting one or more of the chains and a housing of the drive unit. The tensioning system applies a tension force to the contacted chains such that backlash in the sprocket configuration is reduced. The tensioning system offers the ability to achieve zero backlash under operational load conditions, as well as the ability to dampen any severe shock loads that exceed the operational loads.

The present invention also provides a method for applying torque to a solar reflector. The method includes the steps of applying an input torque to an input shaft, and coupling a multi-stage sprocket configuration to the input shaft. The sprocket configuration converts the input torque into an output torque. The method further includes the step of coupling an output shaft to the sprocket configuration, where the output hub, attached to the housing, and mounted on the output shaft, applies the output torque to the solar reflector.

BRIEF DESCRIPTION OF THE DRAWINGS

The various advantages of the present invention will become apparent to one skilled in the art by reading the following specification and subjoined claims and by referencing the following drawings, in which:

FIG. 4 is a cross-sectional view taken along lines 4—4 in FIG. 3;

FIG. 6 is a plan view of a second stage of a multi-stage sprocket configuration in accordance a preferred embodiment of the present invention;

FIG. 7 is a plan view of a third stage of a multi-stage sprocket configuration in accordance with a preferred embodiment of the present invention;

FIG. 8 is a plan view of a first stage tensioner assembly in accordance with a preferred embodiment of the present invention;

FIG. 9 is a plan view of the first stage tensioner assembly shown in FIG. 8 without an adjuster assembly;

FIG. 10 is a cross-sectional view taken along lines 10—10 in FIG. 9;

FIG. 11 is a plan view of a second stage tensioner assembly in accordance with a preferred embodiment of the present invention;

FIG. 12 is a plan view of the second stage tensioner assembly shown in FIG. 11 without an adjuster assembly;

FIG. 13 is a cross-sectional view taken along lines 13—13 in FIG. 12;

FIG. 14 is a plan view of a third stage tensioner assembly in accordance with the present invention;

FIG. 15 is a plan view of the third stage tensioner assembly shown in FIG. 14 without an adjuster assembly;

FIG. 28 is a plan view of a first stage tensioner assembly in accordance with an alternative embodiment of the present invention;

FIG. 29 is a plan view of a second stage tensioner assembly in accordance with an alternative embodiment of the present invention; and FIG. 30 is a plan view of a third stage tensioner assembly in accordance with an alternative embodiment of the present invention.

DETAILED DESCRIPTION OF THE PREFERRED EMBODIMENTS

Figure 1:
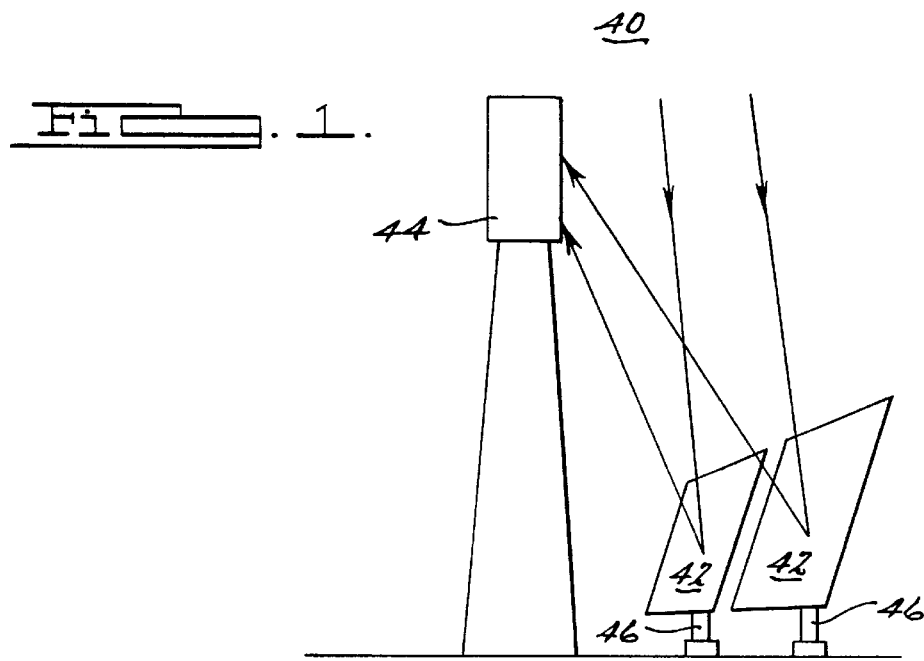
FIG. 1 is an isometric view of a high concentration solar central receiver system useful in understanding the present invention.

In FIG. 1, a high concentration solar central receiver system 40 in accordance with a preferred embodiment of the present invention is shown. The central receiver system 40 has a "surround field" of heliostats 42 reflecting solar radiation to a common receiver 44. It will be noted that due to the need to account for singularity, each heliostat 42 must have the ability to rotate 360°. Each heliostat 42 therefore has a drive system (not shown) mounted between the heliostat 42 and a pedestal 46. It is important to note that while the present invention will be described with respect to a field of heliostats 42, other types of solar reflectors and receiver configurations can be readily used without parting from the spirit and scope of the invention.

Figure 2:
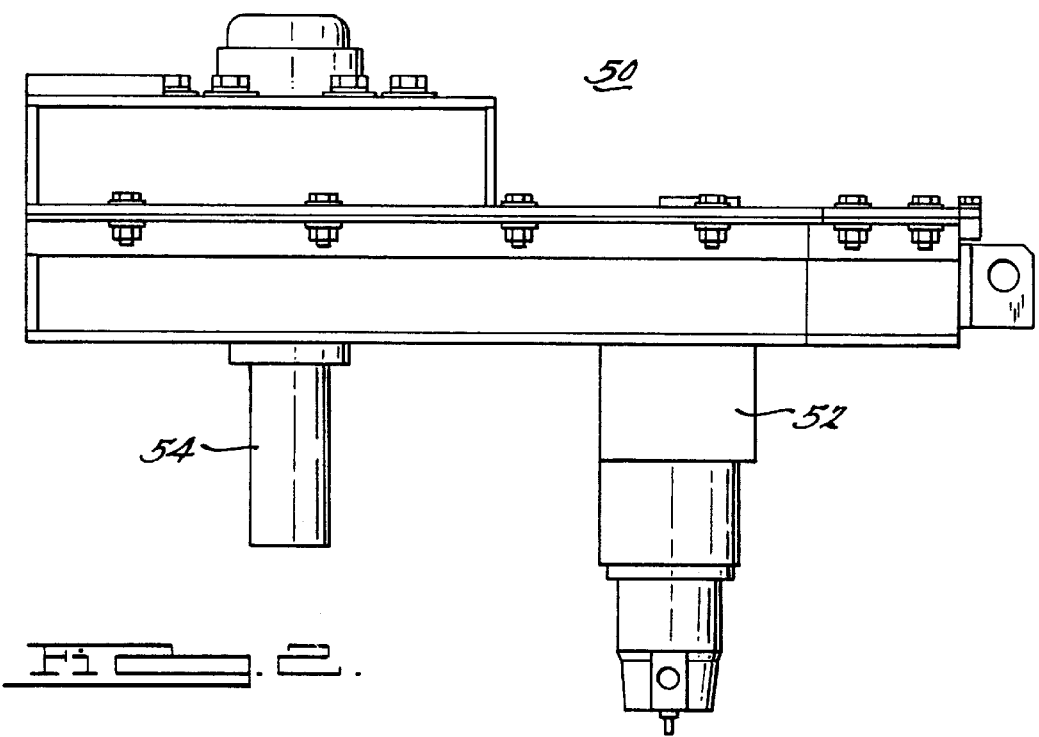
FIG. 2 is a side view of an azimuth drive unit for a solar system in accordance with a preferred embodiment of the present invention.
Figure 3:
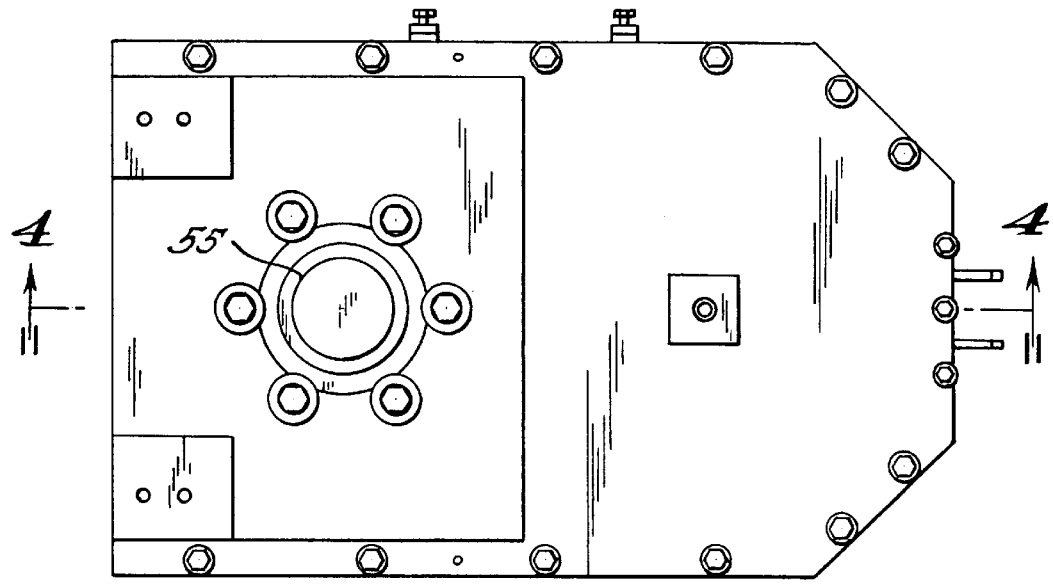
FIG. 3 is a plan view of the azimuth drive unit shown in FIG. 2.

Turning now to FIG. 2, one embodiment of an azimuth drive unit 50 in accordance with the present invention is shown. Generally, the drive unit 50 is mounted on a pedestal 46 (FIG. 1) and receives an input torque from a motor 52. FIG. 4 shows that an output shaft 54 attaches to the heliostat pedestal 46 and the hub 55 of this output shaft 54 attaches to the housing 58 to provide a desired output torque. The other end of the output shaft 54 extends into the pedestal 46. The drive unit has a unique design to resist backlash and provide increased stiffness such that the overall operability of the solar central receiver system 40 is enhanced.

Turning now to FIG. 4, it can be seen that the azimuth drive unit 50 has an input shaft assembly 56, a multi-stage sprocket configuration 60, an output shaft 54 and an output hub 55. The unit 50 is enclosed by a housing 58, which attaches to the output hub 55 and is mounted on the pedestal 46. The input shaft assembly 56 receives an input torque from an attached motor 52 (FIG. 2), and the multi-stage sprocket configuration 60 is coupled to the input shaft assembly 56. The sprocket configuration 60 converts the input torque into the desired output torque, and the output hub 55 is coupled to the sprocket configuration 60 for applying the output torque to a solar reflector such as heliostat 42 (FIG. 1). It can be seen that the sprocket configuration 60 preferably has a first stage 70, a second stage 80, and a third stage 90. It can further be seen that generally the input shaft assembly 56 is coupled to the first stage 70 by a chain and sprocket, the first stage 70 is coupled to the second stage 80 by an intermediate shaft, and the second stage 80 is coupled to the third stage 90 by an intermediate shaft. Furthermore, each stage has one or more chains. Specifically, the input shaft assembly 56 transfers torque to the first stage 70 via a chain to be described below. The first stage 70 transfers torque to the second stage 80 via a spacer 64 disposed between intermediate sprockets. The second stage 80 transfers torque to the third stage 90 via a spacer disposed between intermediate sprockets. The third stage 90 is coupled to the output hub 55 to provide the output torque. The output hub 55 is mounted on the shaft 54, which is attached to pedestal 46 of FIG. 1.

The sprocket configuration therefore includes a plurality of sprockets coupled to the input shaft assembly 56 and the output shaft 54, and a plurality of chains linking the sprockets such that the input torque is converted into the desired output torque. As will be discussed in greater detail below, a preferred approach involves the use of a tensioning system to contact one or more of the chains and the housing 58 of the drive unit 50. It will be shown that the tensioning system applies a tension force to the contacted chains such that backlash in the sprocket configuration is reduced.

Figure 5:
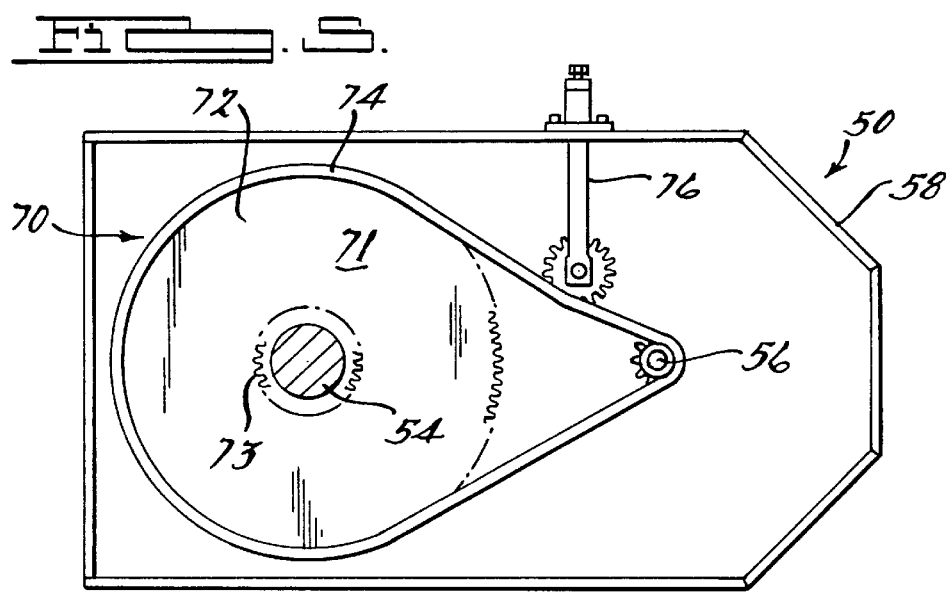
FIG. 5 is a plan view of a first stage of a multi-stage sprocket configuration in accordance with a preferred embodiment of the present invention.

FIG. 5 shows the first stage 70 of the sprocket configuration 60 in greater detail. Specifically, the first stage 70 has an intermediate shaft assembly 72, and a chain 74 for connecting the intermediate shaft assembly 72 to the input shaft assembly 56. The first stage 70 further includes a tensioner assembly 76 for reducing backlash in the chain 74. Although one tensioner assembly 76 is shown on one side of the chain 74, an additional tensioner could be located opposite the tensioner 74.

Figure 18:
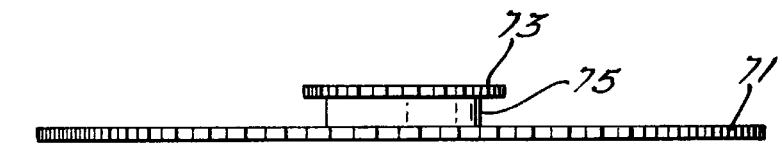
FIG. 18 is a side view of a first and second stage intermediate shaft assembly in accordance with the present invention.
Figure 19:
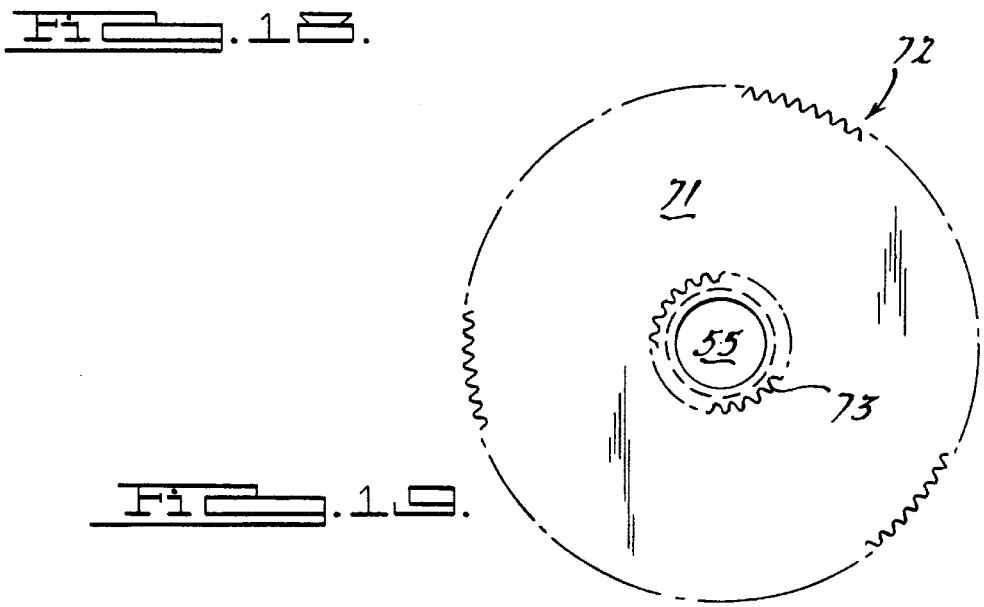
FIG. 19 is a plan view of the shaft assembly shown in FIG. 18.

FIGS. 18 and 19 show the intermediate shaft assembly 72 in greater detail. Specifically, it can be seen that a lower sprocket 71 is fixed to an upper sprocket 73 by virtue of a spacer 75. The intermediate shaft assembly 72 therefore provides the transition from the first stage 70 to the second stage 80. The larger diameter of the lower sprocket 71 and other sprockets further provide the reduction in gear ratio necessary for most solar tracking applications. It can also be seen that the lower sprocket 71, the spacer 75, and the upper sprocket 73, all have an aperture 55 for receiving the output shaft 54. As will be discussed in greater detail below, a plurality of bearing members are coupled to the output shaft 54 for improving stiffness.

Turning now to FIG. 6, the second stage 80 of the sprocket configuration 60 is shown in greater detail. Specifically, it can be seen that the second stage 80 includes an intermediate shaft assembly 82, and a chain 84 for coupling the intermediate shaft assembly 82 to the upper sprocket 73 of the intermediate shaft assembly 72. It can be seen that this stage also has a tensioner assembly 86 for reducing backlash in the chain 84. Although one tensioner assembly 86 is shown on one side of the chain 84, an additional tensioner could be located opposite the tensioner 86.

Figure 20:
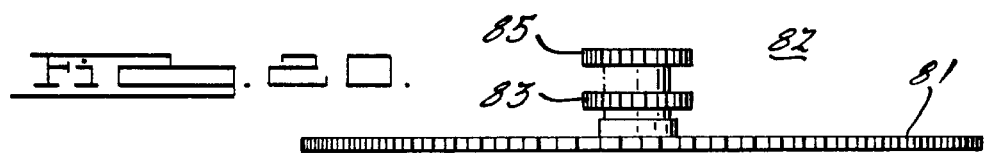
FIG. 20 is a side view of a second and third stage intermediate shaft assembly in accordance with the present invention.
Figure 21:
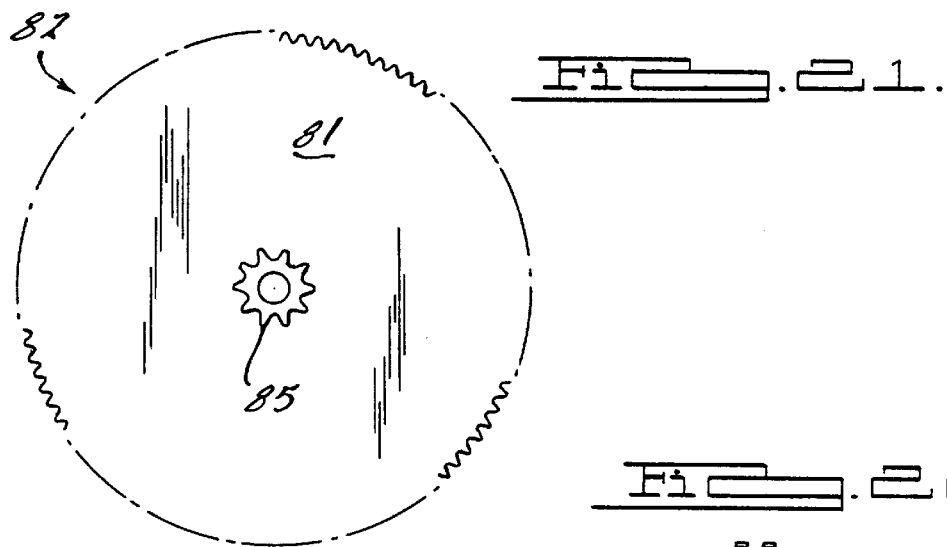
FIG. 21 is a plan view of the shaft assembly shown in FIG. 20.

FIGS. 20 and 21 show the intermediate shaft assembly 82 in greater detail. Specifically, it can be seen that the intermediate shaft assembly 82 has a lower sprocket 81, a middle sprocket 83, and an upper sprocket 85. The middle sprocket 83 has a hollow shaft attached to the lower sprocket 81, and the upper sprocket 85 has a hollow shaft attached to the middle sprocket 83. The sprockets 81, 83, 85 have hollow shafts so that the input shaft assembly 56 can extend therethrough. The dual sprocket configuration of the middle sprocket 83 and the upper sprocket 85 provide redundancy and therefore improved reliability in the third stage 90. However, a single sprocket and chain configuration may be used.

Turning now to FIG. 7, the third stage 90 of the multi-stage sprocket configuration 60 is shown in greater detail. Specifically, it can be seen that a hub shaft assembly 92 is coupled to the intermediate shaft assembly 82 of the second stage 80 by a matched pair of chains 94. Furthermore, the third stage 90 has a tensioner assembly 96 for reducing backlash in the matched pair of chains 94. Although one tensioner assembly 96 is shown on one side of the chain 94, an additional tensioner could be located opposite the tensioner 96.

Figure 22:
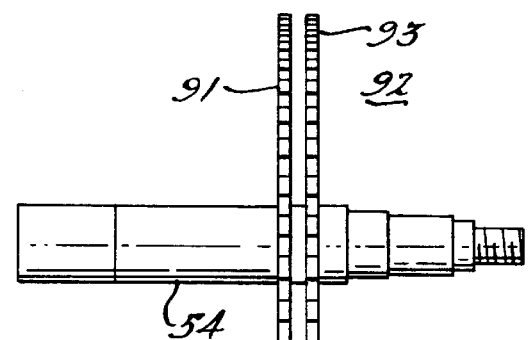
FIG. 22 is a side view of a hub shaft assembly in accordance with the present invention.
Figure 23:
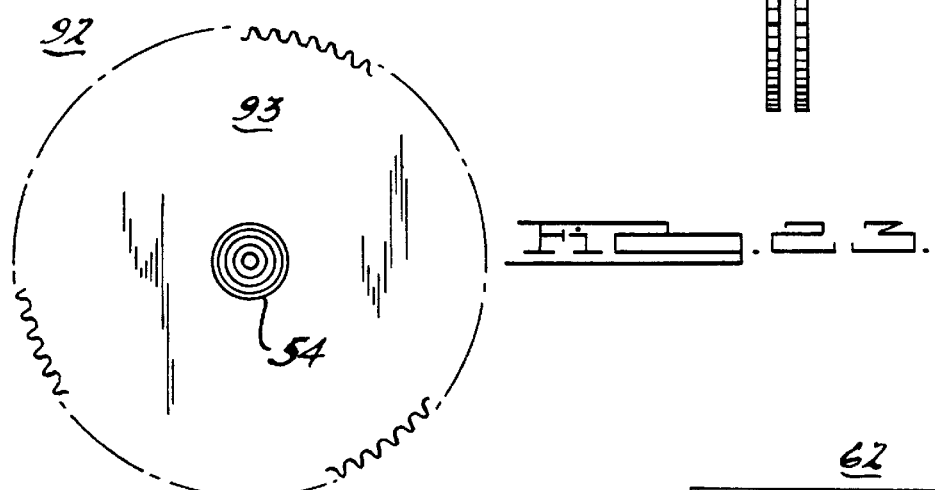
FIG. 23 is a plan view of the shaft assembly shown in FIG. 22.
Figure 24:
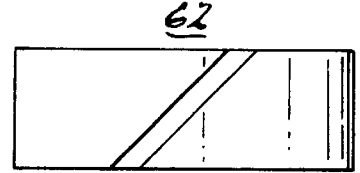
FIG. 24 is a side view of a hub shaft bearing in accordance with the present invention.

Turning now to FIGS. 22 and 23, the hub shaft assembly 92 of the third stage 90 is shown in greater detail. Specifically, the hub shaft assembly 92 has a lower sprocket 91 and an upper sprocket 93 fixed to the output shaft 54. As already noted, the dual sprocket configuration of the lower sprocket 91 and upper sprocket 93 provide redundancy for reliability purposes.

The tensioner assemblies of the present invention will now be described in greater detail. As already discussed, each stage of the multi-stage sprocket configuration 60 may have one or more tensioner assemblies to reduce backlash. FIGS. 8–10 show the tensioner assembly 76 of the first stage 70 in greater detail. It can be seen that generally, the tensioner assembly 76 has an adjuster assembly 100, a chain contacting member, and an intermediate section. The adjuster assembly 100 is fixedly coupled to the housing 58 (FIG. 5) of the drive unit 50. The chain contacting member contacts one of the chains, and the intermediate section is coupled to the adjuster assembly 100 and the chain contacting member such that the tension force is transferred from the housing 58 to the contacted chain. Here, the intermediate section is a shaft 102, and the chain contacting member is a sprocket 104 rotatably coupled to the shaft 102. Rotatable coupling is achieved by a sprocket pin 106.

FIGS. 11–13 show the tensioner assembly 86 of the second stage 80 in greater detail. Specifically, an adjuster assembly 110, a shaft 112, and a sprocket 114 provide tensioning to one side of the chain 84 of the second stage 80 (FIG. 6). Rotatable coupling between the sprocket 114 and the shaft 112 is achieved by a sprocket pin 116. While one tensioner assembly 86 is shown here, it is preferred that multiple tensioner assemblies be used for each stage to provide maximum stiffness and backlash resistance. Furthermore, while the illustrated tensioner assemblies are perpendicular to the housing 58, it is preferred that the tensioner assemblies be perpendicular to the chain being contacted.

Figure 16:
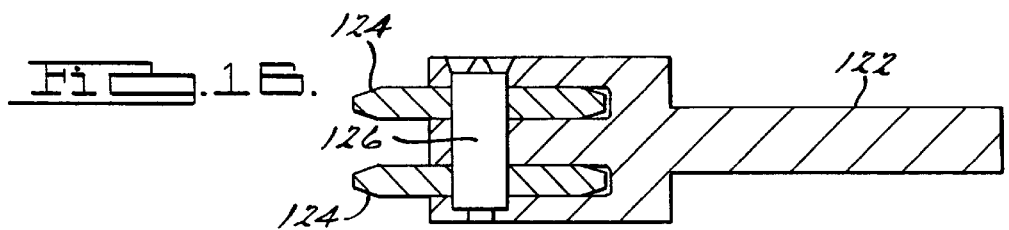
FIG. 16 is a cross-sectional view taken along lines 16—16 in FIG. 15.

FIGS. 14–16 show the tensioner assembly 96 of the third stage 90 in greater detail. Specifically, it can be seen that here the chain contacting member includes a plurality of sprockets 124 rotatably coupled to a modified shaft 122. The adjuster assembly 120 can be identical to that of the tensioner assembly 76 of the first stage 70. Similarly, rotatable coupling is achieved via a sprocket pin 126.

Figure 17:
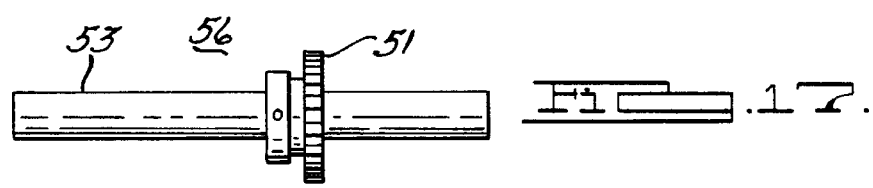
FIG. 17 is a side view of an input shaft assembly in accordance with a preferred embodiment of the present invention.

FIG. 17 shows the input shaft assembly 56 in greater detail. Specifically, it can be seen that the input shaft assembly 56 has a sprocket 51 fixed to a shaft 53. It is preferred that the sprocket 51 be drilled and tapped for a set screw, where the shaft 53 is spot drilled to provide recess for the set screw. While the sprocket 51 is described here as being part of the input shaft assembly 56, it will be appreciated that the sprocket 51 can also be viewed as part of the multi-stage sprocket configuration 60. Similarly, the output shaft 54 (FIG. 22) can be viewed as an assembly including the sprockets 91, 93, Notwithstanding, the skilled reader will view the distinction as one of mere semantics and not limiting with regard to the scope of the invention.

Returning now to FIG. 4, it can be seen that the drive unit 50 further includes a plurality of bearing members 62, 64 coupled to the output shaft 54 for adding stiffness to the output shaft 54. Specifically, a first bearing member 62 is rotatably coupled to the output shaft 54 on the bottom of the housing 58. A second bearing member 64 is rotatably coupled to the output shaft 54 on the first stage 70 of the sprocket configuration 60. It will be appreciated that a number of advantages are associated with such a bearing configuration. The hub assembly 55 contains a second set of bearings that allow the hub 55, fixedly attached to the housing 58, to rotate about the main output shaft 54. Thus, the housing 58 rotates the heliostat reflector mounted on the housing 58. Specifically, FIG. 4 shows that the bearing members in the hub assembly 55 provide the desired stiffness and strength as that available under conventional designs employing a single, large-diameter custom bearing, but at a fraction of the cost. In fact, standard automotive trailer axles with tapered roller bearings that resist the combination of overturning moments and thrust loads can be readily used for this purpose.

Figure 25:
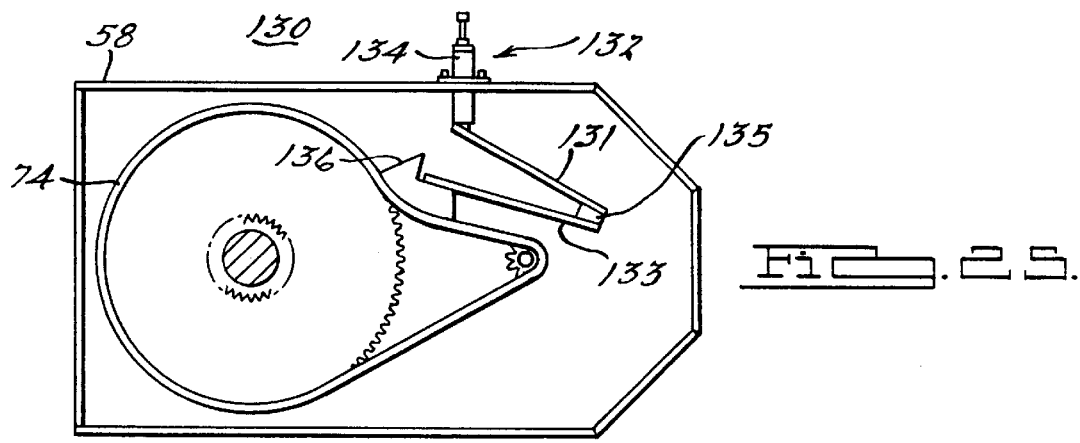
FIG. 25 is a plan view of a first stage of a multi-stage sprocket configuration in accordance with an alternative embodiment of the present invention.
Figure 26:
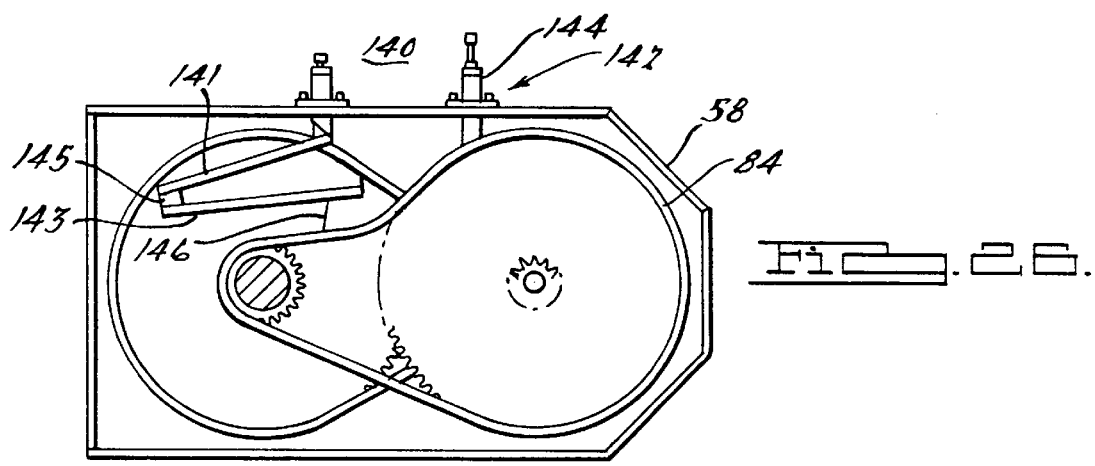
FIG. 26 is a plan view of a second stage of a multi-stage sprocket configuration in accordance with an alternative embodiment of the present invention.
Figure 27:
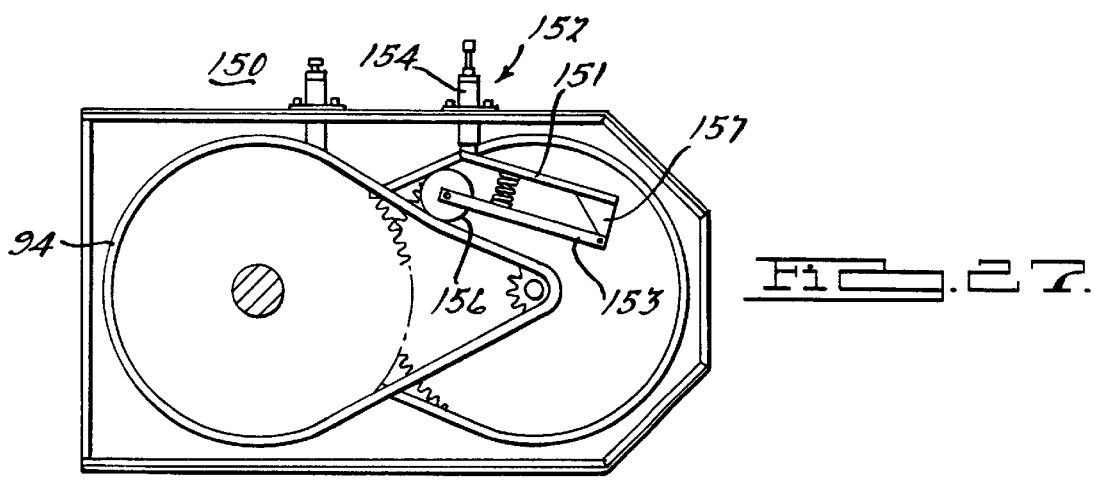
FIG. 27 is a plan view of a third stage of a multi-stage sprocket configuration in accordance with an alternative embodiment of the present invention.

Turning now to FIGS. 25–27, an alternative approach to the tensioner assemblies of the multi-stage sprocket configuration is shown. Specifically, FIGS. 25 and 28 show an alternative first stage 130 in greater detail. It can be seen that the alternative first stage 130 has a tensioner assembly 132 with a design that differs from the preferred embodiment. The tensioner assembly 132 has an adjuster assembly 134 fixedly coupled to the housing 58 of the drive unit 50 as seen in the preferred embodiment. The tensioner assembly 132 also has a chain contacting member, such as a chain follower 136, fixedly coupled to an intermediate section for contacting the chain 74. The intermediate section is therefore coupled to the adjuster assembly 134 and the chain follower 136 such that the tension force is transferred from the housing 58 to the contacted chain 74. Unlike the preferred embodiment, however, the intermediate section includes an upper spring 131, a lower spring 133, and a connector block 135. The upper spring 131 is fixedly coupled to the adjuster assembly 134, and the lower spring 133 is fixedly coupled to the chain follower 136. The connector block 135 is fixedly coupled to the upper spring 131 and the lower spring 133 such that the intermediate section forms a cantilever. While a traditional screw and mating through hole are shown, any conventional mechanism for fixedly coupling the above components can be used.

FIGS. 26 and 29 show the tensioner assembly 142 of the alternative second stage 140. Specifically, it can be seen that an adjuster assembly 144 is fixedly coupled to the housing 58 of the drive unit 50. A chain follower 146 acts as a chain contacting member and is fixedly coupled to an intermediate section of the tensioner assembly 142. The intermediate section is coupled to the adjuster assembly 144 and the chain follower 146 such that the tension force is transferred from the housing 58 to the contacted chain 84. As with the alternative first stage 130, it can be seen that the intermediate section of the alternative second stage 140 includes an upper spring 141, a lower spring 143, and a connector block 145. The upper spring 141 is fixedly coupled to the adjuster assembly 144, and the lower spring 143 is fixedly coupled to the chain follower 146. The connector block 145 is fixedly coupled to the upper spring 141 and the lower spring 143 such that the intermediate section forms a cantilever.

Turning now to FIGS. 27 and 30, a tensioner assembly 152 for an alternative third stage 150 is shown. Specifically, the tensioner assembly 152 has an adjuster assembly 154, a chain contacting member, and an intermediate section as in the embodiments discussed above. The chain contacting member is an idler disk 156 rotatably coupled to the intermediate section for contacting the chain 94. As best seen in FIG. 30, the intermediate section includes a back plate 151 fixedly coupled to the adjuster assembly 154. A pivot arm 153 is rotatably coupled to the idler disk 156, and a biasing spring 155 is fixedly coupled to the back plate 151 and the pivot arm 153 such that the back plate 151 and the pivot arm 153 are biased away from one another. The intermediate section further includes a pivot bracket 157 fixedly coupled to the back plate 151 and rotatably coupled to the pivot arm 153 such that the intermediate section forms a cantilever.

It will be appreciated that the drive unit 50 of the present invention represents a number of improvements over conventional drive units. For example, the double shaft, ganged three-stage sprocket configuration achieves high reduction ratios, with high efficiency and very low costs in comparison to costly gear driven approaches. The drive unit 50 can also be readily modified to meet higher load carrying requirements by either increasing the size of the sprockets and chains, or by combining the sprockets and chains in sets of two or more, riveted, welded, or bolted together. An example of this can be found in the third stage 90 as best seen in FIG. 4. This type of redundancy protects against breakage of one or more of the chains, albeit at a lower load carrying capacity. Other conventional devices can be disposed within the housing 58 to ensure that broken chains do not fall into the workings below. Such an approach could involve the use of a thin sheet metal or other material to separate movable parts.

Other benefits are provided by the unique shaft and bearing design. For example, as already discussed, the set of bearing members in the hub 55 (such as tapered roller bearings or other equivalent roller bearings) offers the same stiffness and strength of a large diameter bearing, at a fraction of the cost. The elimination of the large diameter bearing allows the housing size, weight and cost to be further minimized. The use of low cost spacers and bushings to sequentially mount the three stages of the drive unit 50 allows the proper position to be maintained. The compact design of the multiple sprocket assemblies mounted on two shafts further reduces weight, cost, and complexity associated with multiple shafts and sprockets.

Furthermore, the output hub 55 is positioned to minimize interference with the reflector structure. The output shaft 54 is allowed to "nest" in the supporting pedestal 46, which reduces the loads and moments. The output shaft 54 is also designed to easily slip into the pedestal 46 (FIG. 1) for ease of assembly and disassembly with adapter fittings. The input shaft assembly 56 provides an attachment for measuring the motor turns and/or angular rate with optical or hall effect sensors, which provides high levels of controllability. The output shaft 54 may also be easily formed as a hollow cylinder to accommodate wiring and cables passing through a concentric hole. It can further be seen that the output shaft 54 and the input shaft assembly 56 are configured and positioned so that dust caps can be easily fitted to eliminate the build-up of injurious water, sand, and dust on the bearings and bushings.

With regard to the motor 52 (FIG. 2), it will be appreciated that the location beneath the housing 58 provides a number of benefits. For example, overall gear reduction, and minimized interference with the reflector structure are particularly notable advantages. Furthermore, locating the motor 52 beneath the housing 58 protects the motor 52 from rain and ice build-up. It will further be appreciated that the housing 58 can be sized to match the required location for the corresponding elevation drive unit, thus providing a more compact, lower cost configuration. Furthermore, the housing 58 is configured to efficiently transfer the loads from the elevation actuator through the output shaft 54, to the pedestal 46 by an essentially straight load path through an efficient "box" design.

With regard to assembly of the drive unit 56, it can be seen that the drive unit 50 is easily assembled in the field without special tools and by relatively unskilled labor. For example, the unit 50 is easily assembled by simply connecting the chains in prescribed links, and then assembling the chain and sprockets sequentially. The result is a compact and rugged unit that can be easily shipped. Other benefits such as the low friction bushings allow sprocket rotation about the shafts without degradation in overall performance efficiency. Furthermore, use of these lower friction bushings, together with high efficiency chains, results in a drive unit 50 that has high efficiency, yet has sufficient damping to minimize control system oscillations. This also eliminates the need for complex rate sensing approaches for achieving stability.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A solar reflector assembly comprising:

a reflector;

a pedestal; and an azimuth drive unit including a housing, an input shaft, an output shaft and a multi-stage chain drive, the reflector being mounted on the housing, the input shaft being rotatably supported by the housing, the input shaft adapted to receive an input torque for altering the azimuth of the solar reflector, the output shaft being rotatably supported by the housing and fixed to the pedestal, the multi-stage chain drive having an input stage, an idler stage and an output stage, the input stage including an input sprocket that is coupled for rotation with the input shaft, a first idler sprocket and a first chain rotatably coupling the input sprocket and the first idler sprocket, the idler stage including a second idler sprocket coupled for rotation with the first idler sprocket, a third idler sprocket and second chain rotatably coupling the second and third idler sprockets, the output stage including at least one fourth idler sprocket coupled for rotation with the third idler sprocket, at least one output sprocket coupled for rotation with the output shaft and at least an output chain rotatable coupling the fourth idler sprocket to the output sprocket;

wherein a torque input received by the input shaft is multiplied by the multi-stage chain drive and output to the output shaft to cause the housing to rotate about the output shaft to thereby affect the azimuth of the reflector.

2. The solar reflector assembly of claim 1, wherein the multi-stage chain drive further includes a tensioner assembly, the tensioner assembly being fixedly coupled to the housing and including a member for exerting a tensioning force against at least one of the first chain, the second chain and the output chain.

3. The solar reflector assembly of claim 2, wherein the member is one of a rotatable sprocket and a rotatable idler disk.

4. The solar reflector assembly of claim 1, wherein the input, idler and output stages of the multi-stage chain drive are arranged in a stacked configuration.

5. The solar reflector assembly of claim 4, wherein the first and second idler sprockets are supported for rotation about the output shaft.

6. The solar reflector assembly of claim 4, wherein the third and fourth idler sprockets are supported for rotation about the input shaft.

7. The solar reflector assembly of claim 1, wherein the reflector is a heliostat.

* * * * *